(12) United States Patent
Cook (10) Patent No.: US 9,348,126 B2
(45) Date of Patent: May 24, 2016

(54) DERIVED ALL-REFLECTIVE AFOCAL OPTICAL SYSTEM WITH ASPHERIC FIGURED BEAM STEERING MIRROR

(75) Inventor: Lacy G. Cook, El Segundo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 720 days.

(21) Appl. No.: 13/291,191

(22) Filed: Nov. 8, 2011

(65) Prior Publication Data

US 2013/0114156 A1     May 9, 2013

(51) Int. Cl.
| | |
|---|---|
| *G02B 17/06* | (2006.01) |
| *G02B 23/06* | (2006.01) |
| *G02B 25/00* | (2006.01) |
| *G02B 26/10* | (2006.01) |

(52) U.S. Cl.
CPC .......... *G02B 17/061* (2013.01); *G02B 17/0663* (2013.01); *G02B 23/06* (2013.01); *G02B 25/007* (2013.01); *G02B 26/105* (2013.01)

(58) Field of Classification Search
CPC .................. G02B 7/1821; G02B 23/00–23/10; G02B 25/007; G02B 26/10–26/129
USPC ........... 359/364–366, 857–864, 196.1–226.3, 359/850, 865, 868, 869, 350–351, 359–360
See application file for complete search history.

(56) References Cited

U.S. PATENT DOCUMENTS

| | | | |
|---|---|---|---|
| 3,524,698 A | 8/1970 | Brueggemann | |
| 3,674,334 A | 7/1972 | Offner | |
| 3,887,263 A * | 6/1975 | Thompson, III | ........... 359/203.1 |
| 4,101,195 A | 7/1978 | Frosch et al. | |
| 4,432,596 A * | 2/1984 | Campbell et al. | ............. 359/351 |
| 4,804,258 A | 2/1989 | Kebo | |
| 5,078,502 A | 1/1992 | Cook | |
| 5,144,476 A | 9/1992 | Kebo | |
| 5,173,801 A * | 12/1992 | Cook | ........................... 359/365 |
| 5,227,923 A | 7/1993 | Kebo | |

(Continued)

FOREIGN PATENT DOCUMENTS

| | | |
|---|---|---|
| GB | 2247090 A | 2/1992 |
| JP | 2215287 A | 8/1990 |
| WO | 9534840 A1 | 12/1995 |

OTHER PUBLICATIONS

Anonymous: Staring Array—Wikipedia, The Free Encyclopedia, Mar. 15, 2008, XP055158132, Retrieved from the Internet: URL:http://web.archive.org/web/20080315230634/http://en.wikipedia.org/wiki/Staring_array [retrieved on Dec. 11, 2014], 2 Pages.

(Continued)

*Primary Examiner* — Bumsuk Won
*Assistant Examiner* — Jeffrey Madonna
(74) *Attorney, Agent, or Firm* — Lando & Anastasi, LLP (57) ABSTRACT

An all-reflective afocal optical system including an aspheric beam steering mirror positioned at an exit pupil of the afocal optical system. In one example, an all-reflective afocal optical imaging system includes a sensor, a afocal optical apparatus including a plurality of mirrors optically coupled together and configured to receive light rays through an entrance pupil of the afocal optical imaging system and to substantially collimate the light rays to provide a collimated optical beam to an exit pupil, and an aspheric beam steering mirror positioned at the exit pupil and configured to receive the collimated optical beam and to direct the collimated optical beam to the sensor.

17 Claims, 5 Drawing Sheets

(56) References Cited

U.S. PATENT DOCUMENTS

| | | | |
|---|---|---|---|
| 5,331,470 A | 7/1994 | Cook | |
| 5,386,316 A * | 1/1995 | Cook | 359/365 |
| 5,550,672 A | 8/1996 | Cook | |
| 5,565,983 A * | 10/1996 | Barnard | 356/328 |
| 6,333,811 B1 * | 12/2001 | Tatian et al. | 359/366 |
| 6,765,719 B2 * | 7/2004 | Lundgren | 359/432 |
| 6,767,103 B2 | 7/2004 | Cook | |
| 6,819,483 B1 * | 11/2004 | Sigler et al. | 359/364 |
| 6,970,286 B1 | 11/2005 | Kunick | |
| 7,933,067 B1 * | 4/2011 | Cook | 359/399 |
| 8,427,744 B2 * | 4/2013 | Cook | 359/399 |
| 2007/0177261 A1 * | 8/2007 | Murdock | 359/399 |
| 2008/0030822 A1 * | 2/2008 | Anderton | G01S 3/781 359/212.1 |
| 2008/0186569 A1 * | 8/2008 | Chen et al. | 359/399 |
| 2010/0202073 A1 | 8/2010 | Cook | |
| 2010/0208319 A1 * | 8/2010 | Kessler | G02B 17/008 359/202.1 |
| 2011/0085235 A1 | 4/2011 | Cook | |
| 2011/0188139 A1 * | 8/2011 | Bentley | G02B 15/02 359/859 |

OTHER PUBLICATIONS

Gross et al.: Handbook of Optical Systems Aberration Theory and Correction of Optical Systems, Aspherical Surfaces, Jan. 1, 2007, pp. 433- 463, XP002603524, ISBN: 978-3-527-40379-0.

* cited by examiner

DERIVED ALL-REFLECTIVE AFOCAL OPTICAL SYSTEM WITH ASPHERIC FIGURED BEAM STEERING MIRROR

BACKGROUND

Afocal optical systems are used in a variety of applications. An afocal foreoptical system may be derived from the first two mirrors of a focal three-mirror anastigmat optical system, such as a focal three-mirror anastigmat telescope. An example of a derived all-reflective afocal optical system is described in U.S. Patent Publication No. 2010/0202073 published on Aug. 12, 2010, which is herein incorporated by reference in its entirety.

SUMMARY OF INVENTION

The derived all-reflective afocal optical system described in U.S. Patent Publication No. 2010/0202073 can provide good image quality for relatively small fields of view, for example, approximately 0.2×0.4 degrees field of view, and using a two-mirror recollimating eyepiece. However, for significantly larger fields of view, such as approximately double the field of view in both planes, the resultant image quality is significantly degraded. Accordingly, aspects and embodiments are directed to the use of an aspheric figured beam steering mirror to obtain greatly improved image quality over a wide field of view while retaining the beam steering function of the beam steering mirror, as discussed in detail below.

According to one embodiment, an all-reflective afocal optical imaging system comprises a sensor, an afocal optical apparatus including a plurality of mirrors optically coupled together and configured to receive light rays through an entrance pupil of the afocal optical imaging system and to substantially reimage and recollimate the light rays to provide a collimated optical beam to a real exit pupil, and an aspheric figured beam steering mirror positioned at the real exit pupil and configured to receive the collimated optical beam and to direct the collimated optical beam to the sensor, the aspheric figured beam steering mirror being further configured to move over a range of angular motion to steer a field of view of the sensor.

In one example, the sensor is a camera. In another example, the afocal optical apparatus is an all-reflective derived afocal optical apparatus, derived from the first two mirrors of a multi-mirror focal optical system. The multi-mirror focal optical system may be a Cassegrain telescope or a focal three-mirror anastigmat, for example. In one example, the plurality of mirrors includes a primary mirror positioned at the entrance pupil, a secondary mirror optically coupled to the primary mirror, and an eye-piece optically coupled to the secondary mirror and configured to receive the light rays from the secondary mirror and to provide the collimated optical beam to the aspheric figured beam steering mirror. The eye-piece may include, for example, a positive-powered tertiary mirror configured to substantially collimate the light rays received from the secondary mirror to provide substantially collimated light rays, and a negative-powered near-flat quaternary mirror having lesser power than the tertiary mirror and configured to receive the substantially collimated light rays from the tertiary mirror, to further collimate the substantially collimated light rays and to provide the collimated optical beam to the real exit pupil. In one example, the primary mirror has an ellipsoidal configuration. In another example, the secondary mirror has a hyperboloidal configuration and is positioned facing the primary mirror. The eye-piece may be positioned behind the primary mirror and the secondary mirror. In one example, the primary mirror and the secondary mirror are the first two mirrors of a focal three-mirror anastigmat, and the all-reflective afocal optical imaging system is a derived afocal system, derived from the first two mirrors of the focal three-mirror anastigmat. In one example, the aspheric figured beam steering mirror is a reflective Schmidt corrector. In one example, the range of angular motion of the aspheric figured beam steering mirror is at least ±4 degrees. In another example, the angular range of motion is at least ±10 degrees.

According to another embodiment, an optical imaging method comprises receiving light rays incident on an afocal optical apparatus including a plurality of mirrors optically coupled together, reimaging and recollimating the light rays with the afocal optical apparatus to provide a collimated optical beam to a real exit pupil, reflecting the collimated optical beam with an aspheric figured beam steering mirror positioned at the real exit pupil to direct the collimated optical beam to an imaging sensor, and actuating the aspheric figured beam steering over a range of angular motion to steer a field of view of the sensor.

In one example, actuating the aspheric figured beam steering mirror includes actuating the aspheric figured beam steering mirror over an angular range of motion of at least ±4 degrees. In another example, actuating the aspheric figured beam steering mirror includes actuating the aspheric figured beam steering mirror over an angular range of motion of at least ±10 degrees. In another example, the afocal optical apparatus includes a primary mirror, a secondary mirror and an eye-piece, and reimaging and recollimating the light rays includes reflecting the light rays with the primary mirror towards the secondary mirror, reflecting the light rays received from the primary mirror with the secondary mirror towards the eye-piece, and recollimating the light rays received from the secondary mirror in the eye-piece to provide the collimated optical beam to the real exit pupil. In one example, the eye-piece includes a positive-powered tertiary mirror optically coupled to a negative-powered near-flat quaternary mirror having lesser power than the tertiary mirror. In this example, recollimating the light rays received from the secondary mirror in the eye-piece may include substantially collimating the light rays received from the secondary mirror using the tertiary mirror to provide substantially collimated light rays, reflecting the substantially collimated light rays from the tertiary mirror to the quaternary mirror, further collimating the substantially collimated light rays using the quaternary mirror to provide the collimated optical beam, and reflecting the collimated optical beam from the quaternary mirror to the aspheric figured beam steering mirror at the real exit pupil.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Afocal optical systems are used in a variety of applications, including imaging, tracking and targeting applications. In particular, an afocal foreoptical system may be used to provide a subsequent instrument, such as a camera or other sensor, with rapid internal pointing, scanning and stabilization using a small, agile beam steering mirror located at the exit pupil of the afocal foreoptics. For example afocal foreoptics provide a collimated interface that may be used in conjunction with scanning and/or staring infrared and/or visible sensors, lidar systems, and polarimetric sensors. The afocal foreoptics together with the beam steering mirror offer numerous benefits, particularly when used with sensors mounted on mobile platforms, including, for example, rapid scanning of the sensors over a wide field of view, relaxed platform pointing and stabilization, simplified integration and testing of the sensors.

In certain examples, optical imaging systems use relatively large afocal foreoptics, for example, having an entrance pupil size in excess of 50 inches. Such optical imaging systems may be used in space-based or high-altitude airborne systems, where it may be desirable to achieve good image resolution, for example, visible diffraction limited image quality, which is an average RMS wavefront error (WFE)<0.071 waves. In this context, it also may be desirable to achieve a very small wavefront error (i.e., to minimize spherical, coma and astigmatism aberrations in the optical system) in combination with an ability to steer the optical field of view over a wide angular range without disturbing the image. To achieve these and other functions, aspects and embodiments are directed to the use of an aspheric figured beam steering mirror in combination with an afocal optical system. In one example, the afocal optical system is an all-reflective derived afocal system, derived from the first two mirrors of a multi-mirror focal optical system, such as a Cassegrain telescope or a focal three-mirror anastigmat, as discussed further below. However, the aspheric beam steering mirror may be used in combination with any afocal foreoptics, not limited to a derived afocal system.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
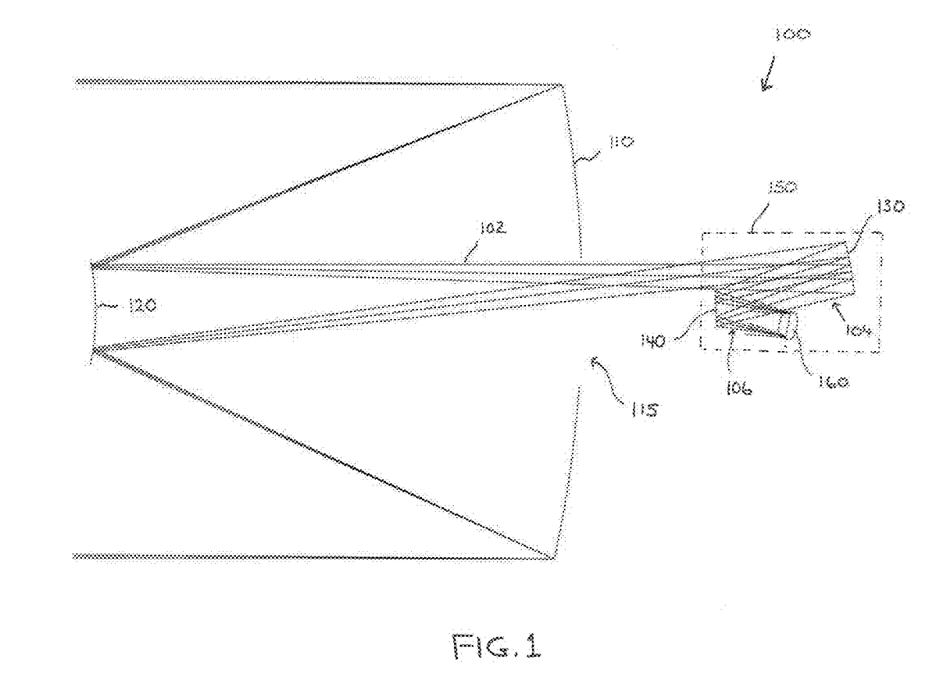
FIG. 1 is an illustration of a ray trace of one example of an all-reflective afocal optical system according to aspects of the invention.
Figure 2:
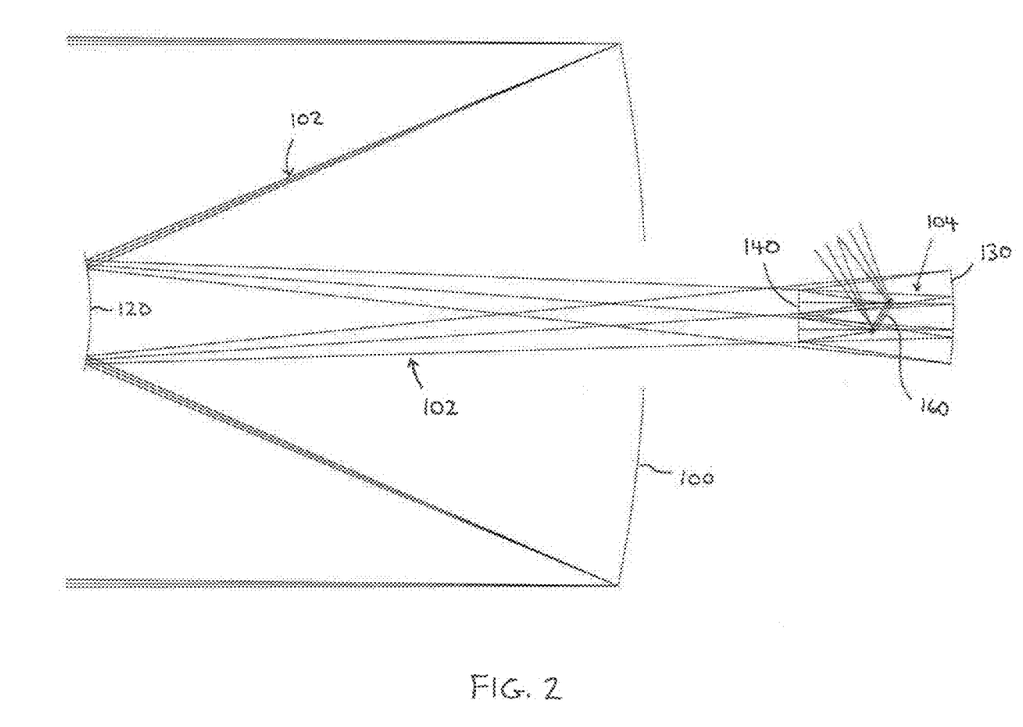
FIG. 2 is a side elevation schematic view of the ray trace of FIG. 1.
Figure 3:
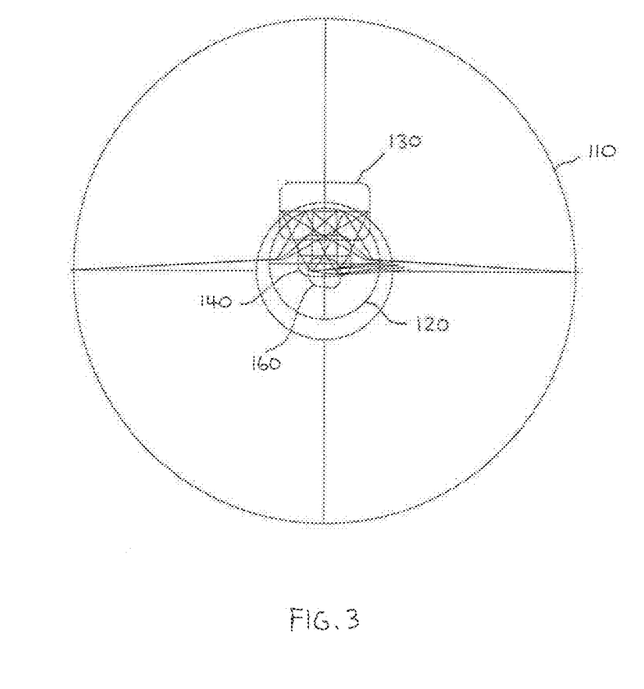
FIG. 3 is an end schematic view of the ray trace of FIG. 1.

Referring to FIG. 1, there is illustrated a ray trace section of an all-reflective afocal optical system 100, in accordance with an embodiment. The optical system 100 includes a primary mirror 110 and secondary mirror 120. The primary mirror 110 has a central opening 115 to allow the light rays 102 to pass through subsequent to reflection from the secondary mirror 120. The primary mirror 110 may be a positive-powered ellipsoidal mirror. The secondary mirror 120 may be a smaller and centered negative-powered hyperbolic mirror. In one example, the primary mirror 110 and secondary mirror 120 are arranged in a classical Cassegrain-like arrangement and have conic or aspheric departures. The optical system 100 further includes all-reflective multi-mirror eye-piece 150 that is positioned behind primary mirror 110 and secondary mirror 120 to form a high performance afocal optical system. In the illustrated example, the eye-piece 150 includes a tertiary mirror 130 and a quaternary mirror 140.

In one embodiment, the light rays 102 impinge on the primary mirror 110 which reflects the beams onto the secondary mirror 120. The light rays 102 are reflected by the secondary mirror 120 towards the eye-piece 150 and onto the tertiary mirror 130. In one example, the tertiary mirror 130 substantially collimates the light rays 102 and reflects collimated light rays 104 onto the quaternary mirror 140 of the eye-piece 150. The quaternary mirror 140 receives the substantially collimated light rays 104 from the tertiary mirror 130, performs further collimation of the light rays 104, and reflects further collimated rays 106 to a beam steering mirror 160 positioned at an exit pupil of the optical system 100. Although not shown in FIG. 1, those skilled in the art will appreciate, given the benefit of this disclosure, that an image-forming optical system or other sensor(s) may be arranged subsequent to beam steering mirror 160.

In one embodiment, the tertiary mirror 130 and quaternary mirror 140 have higher order aspheric surface departures beyond those of conic departures (e.g., paraboloid, hyperboloid, or ellipsoid). The tertiary mirror 130 may be a positive-powered aspheric mirror which has a majority of the positive power that is expected in eye-piece 150 and is configured to substantially collimate light rays 102 incident thereon. In one embodiment, the quaternary mirror 140 is a slightly negative-powered near-flat aspheric mirror which has much less power than the tertiary mirror 130, and is configured to further collimate the rays 104 incident thereon. In one embodiment, the tertiary mirror 130 and quaternary mirror 140 may have small tilts and decenters. The structure, parameters, and/or placement of the tertiary mirror 130 and quaternary mirror 140 in optical system 100 may be arranged to cause a flat-field condition to be achieved at a desired magnification and correction of off-axis aberrations (including coma and astigmatism, for example) over a desired field-of-view. In one embodiment, a majority of the aberrations (e.g., coma, spherical, and astigmatism) are corrected by the tertiary mirror 130, and further aberration correction is performed by the quaternary mirror 140.

Conventionally, the beam steering mirror 160 is a flat mirror. According to one embodiment, the flat mirror is replaced with an aspheric figured beam steering mirror 160. In one example, the aspheric beam steering mirror 160 is constructed similarly to a Schmidt corrector plate, having an aspheric form that compensates for spherical aberrations in the combination of the primary mirror 110, secondary mirror 120 and eye-piece 150. The aspheric beam steering mirror 160 may act similar to a refractive or transmissive element in its ability to correct for spherical aberrations by virtue of its location at a pupil, yet by being a reflective element retains the beam-steering function. By aspherizing the conventionally flat beam steering mirror 160, and constructing it as a reflective Schmidt-like spherical aberration corrector, the resultant image quality may be dramatically improved, for example, by about 3× as shown in the examples below, while still retaining the field-of-view steering capabilities of the beam steering mirror without significant image quality degradation.

Table 1 provides an optical prescription for an example optical system 100 corresponding to the ray trace illustrated in FIG. 1. The optical prescription for this example of the optical system 100 may be generated using an equation which is an industry standard and which would be known to those skilled in the art. It is to be appreciated however, that the prescription given in Table 1 is merely exemplary, and that the prescriptions of various embodiments of the optical system 100 are determined by the intended imaging task to be performed by the optical system.

TABLE 1

| Surface No. | Function | Radius (inches). | CC | Ad | Ae | Af |
|---|---|---|---|---|---|---|
| 1 | Primary mirror | −147.500 | −0.990974 | n/a | n/a | n/a |
| 2 | Secondary mirror | −31.0917 | −1.91155 | n/a | n/a | n/a |
| 3 | Int. Image | inf | n/a | n/a | n/a | n/a |
| 4 | Tertiary mirror | −42.9571 | −0.403789 | 2.243E−07 | 4.029E−10 | −1.686E−11 |
| 5 | Quaternary mirror | 560.181 | n/a | −8.628E−06 | 4.448E−08 | −1.419E−09 |
| 6 | Aspheric BSM | inf | n/a | * | * | * |

| Surface No. | Ag | Thickness (inches) | Material | Y Dec. (inches) | Y tilt (deg) | X tilt (deg) |
|---|---|---|---|---|---|---|
| 1 | n/a | −60.8659 | Reflective | n/a | n/a | n/a |
| 2 | n/a | 75.2488 | Reflective | 0.17935 | 0.7918 | n/a |
| 3 | n/a | 19.8083 | Air | n/a | n/a | n/a |
| 4 | 8.387E−14 | −17.3503 | Reflective | 3.3444 | 5.5597 | n/a |
| 5 | 2.839E−11 | 8.9711 | Reflective | 0.28951 | 3.3694 | n/a |
| 6 | * | n/a | Reflective | 0.07853 | −11.23 | 30.00 |

Entrance pupil is on primary mirror;
Entrance pupil diameter is 59.06 inches;
Exit pupil diameter is 2.944 inches;
Real ray angular magnification is 19.99X;
FOV is 0.4 × 0.8 deg (object space);
Offset to FOV center is −0.636 deg;
Included angle off BSM is 60 deg in x;
and where:
CC is conic constant;
Ad, Ae, Af and Ag are aspheric constants;
FOV is field of view;
deg. is degrees; and
Dec. is a decenter in the Y direction.

For the example optical prescription given in Table 1, the elliptical ortho-normalized Zernike terms are given below. As known to those skilled in the art, the Zernike polynomials are a sequence of polynomials that are orthogonal over the unit disk. The Zernike polynomials provide a basis defined over the circular support area, typically the pupil planes in optical imaging at optical and infrared wavelengths through systems of lenses and mirrors of finite diameter (such as optical system 100), and are used to describe spherical aberrations.

y/x ratio is 0.866 (normalized over a 1 inch radius circle)

$$C4 = 0.39320e\text{-}5\ 2r^2 - 1$$

$$C9 = -0.11305e\text{-}6\ 6r^4 - 6r^2 + 1$$

$$C16 = -0.28959e\text{-}8\ 20r^6 - 30r^4 + 12r^2 - 1$$

$$C25 = 0.17212e\text{-}9\ 70r^8 - 140r^6 + 90r^4 - 20r^2 + 1$$

$$C36 = -0.30181e\text{-}11\ 252r^{10} - 630r^8 + 560r^6 - 210r^4 + 30r^2 - 1$$

The improvement in image quality obtained by aspherizing the beam steering mirror 160 is demonstrated in the following examples. In one example, an optical system 100 is configured according to the prescription given in Table 1, the Zernike terms given above, and the parameters given above.

In this example, optimizing the system with an aspheric beam steering mirror 160, the full 0.4×0.8 field of view is diffraction limited at 0.56 micrometers (μm). By contrast, for the same example optical system (i.e., all parameters remaining the same), but using a conventional flat beam steering mirror instead of the aspheric beam steering mirror 160, the full 0.4×0.8 field of view is diffraction limited at 1.4 μm. Thus, using the aspheric beam steering mirror 160 offers an image quality improvement factor of approximately two and a half (2.5×).

In another example, the optical system 100 is configured according to the prescription given and Table 1 and Zernike terms given above, and with the following parameters:
  Magnification is 21.67;
  Exit pupil diameter is 4.3 inches;
  FOV is 0.4×0.8 deg; and
  FOV offset is 0.86 deg.

The beam steering mirror 160 is configured and positioned at the exit pupil such that ±4.3 degrees of travel of the beam steering mirror covers the 0.8 degree field of view. For this example system, using an aspheric beam steering mirror 160, the central 0.2×0.4 portion of the field of view is diffraction limited at 0.75 μm, and the full 0.4×0.8 field of view is diffraction limited at 1.21 μm. By contrast, for the same example optical system (i.e., all parameters remaining the same), but using a conventional flat beam steering mirror, the central 0.2×0.4 portion of the field of view is diffraction limited at 2.69 μm, and the full 0.4×0.8 field of view is diffraction limited at 3.44 μm. Thus, using the aspheric beam steering mirror 160 provides approximately three times (3×) better image quality.

As discussed above, the additional optical design degrees of freedom offered by aspherizing the beam steering mirror 160 at the exit pupil, namely that the aspheric shape can be tailored and optimized for particular designs and characteristics of the optical system 100, such as determined spherical aberrations of the primary, secondary and/or other mirrors, allows significant improvements in the image quality to be achieved, without loss of the beam steering function. As demonstrated in the examples above, an aspheric beam steering mirror can improve the average RMS wavefront error by approximately 3×. With this improvement, the beam steering mirror may still be used for its intended steering function over angles in excess of ±10 degrees of mirror angular tilt; that is, ±20 degrees of field of view, or about a 40 degree field of view range at the exit pupil. This surprisingly large angular range of the beam steering mirror, while also maintaining the aspheric image improvement function, results because the only aberration introduced by tilting the beam steering mirror 160 (to sweep the field of view) from its nominal design angle is an oblique aberration in both the tangential and sagittal planes. However, this aberration is not a strong function of the beam steering mirror angle.

Figure 4:
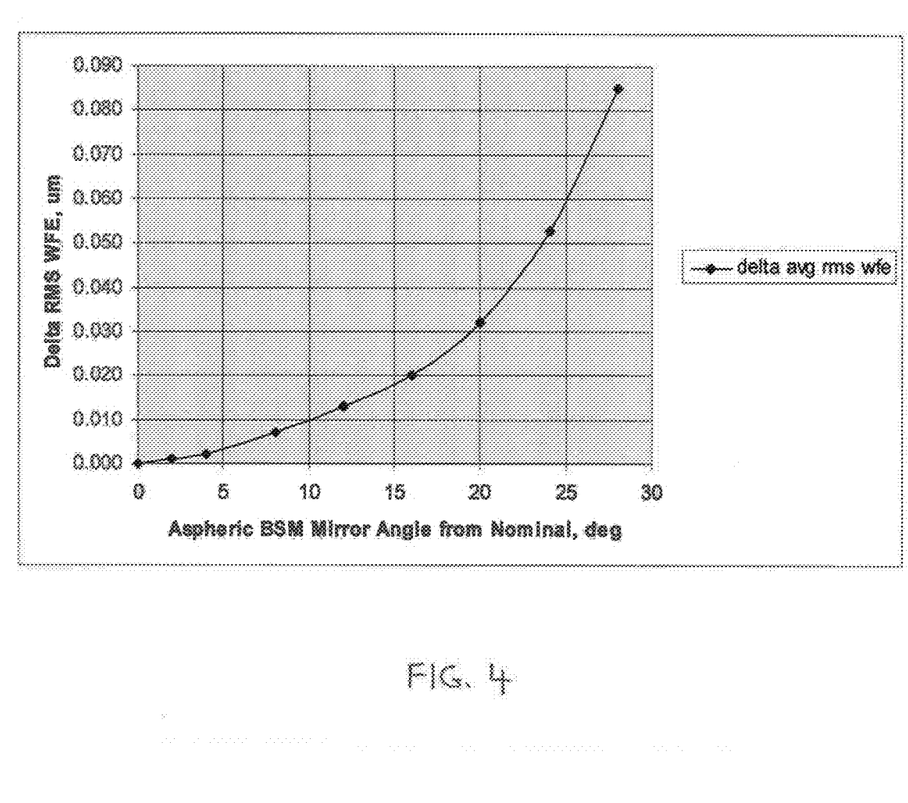
FIG. 4 is a graph illustrating the change in wavefront error as a function of steering angle of the aspheric beam steering mirror in an example optical system according to aspects of the invention.

Referring to FIG. 4 there is illustrated a graph of the delta or change in RMS wavefront error (in μm), that is, the change in the wavefront error directly attributable to tilting the beam steering mirror 160, as a function of the aspheric beam steering mirror angle relative to the nominal design angle (in degrees). In the example corresponding to the results shown in FIG. 4, the afocal field of view is 8.7×17.4 degrees at the exit pupil, the peak-to-valley (PV) mirror surface sag is approximately 1.4 μm causing approximately a 4.4 waves baseline wavefront error. The exit pupil in this example is approximately 4.5 inches in diameter. As can be seen with reference to FIG. 4, the change in wavefront error due to tilting the beam steering mirror is very small, and the oblique spherical aberration (causing the wavefront error delta) from the aspheric beam steering mirror degrades very slowly with steering angle (tilt).

Figure 5:
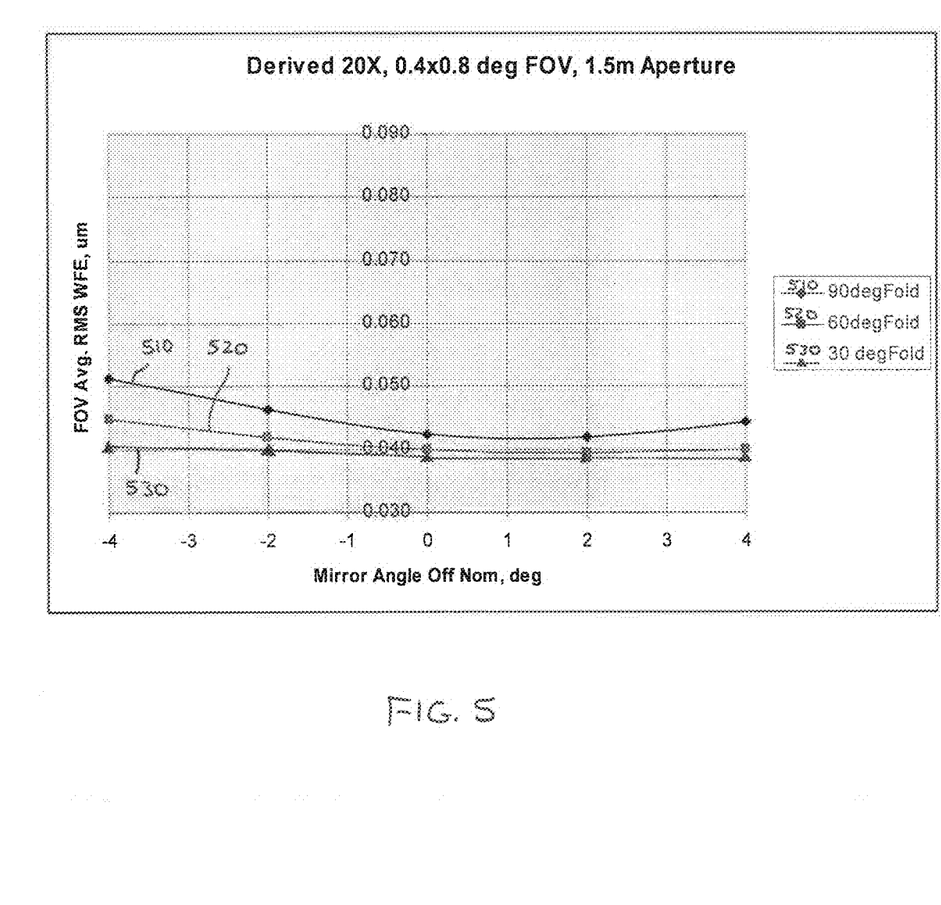
FIG. 5 is a graph illustrating wavefront error as a function of steering angle for examples of optical systems having fold mirrors positioned at different angles, according to aspects of the invention.

Referring to FIG. 5 there is illustrated a graph of field of view average RMS wavefront error as a function of the tilt angle of the beam steering mirror for three examples of an optical system 100 each example including a nominal beam steering mirror at a different angle out of plane. For the results shown in FIG. 5, the aspheric beam steering mirror 160 has nominal out of plane tilt angle values of 15 degrees, 30 degrees, and 45 degrees, resulting in a total fold angle of 30 degrees, 60 degrees, and 90 degrees, respectively. In these examples, the optical system 100 has a derived afocal magnification of 20×, a 0.4×0.8 degree field of view, and a 1.5 meter (m) entrance pupil aperture. In this example, ±4 degrees of angular movement of the beam steering mirror 160 generates a 16 degree field of view at the afocal exit pupil and the 0.8 degree field of view in object space. Trace 510 represents the field of view RMS wavefront error for the system including a 90 degree fold angle off the aspheric beam steering mirror. Trace 520 represents the field of view RMS wavefront error for the system including a 60 degree fold angle off the aspheric beam steering mirror, and trace 530 represents the field of view RMS wavefront error for the system including a 30 degree fold angle off the aspheric beam steering mirror.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. An all-reflective afocal optical imaging system comprising:
   a sensor;
   an afocal optical apparatus including a plurality of mirrors optically coupled together and configured to receive light rays through an entrance pupil of the afocal optical imaging system and to substantially reimage and recollimate the light rays to provide a collimated optical beam to a real exit pupil; and
   an aspheric figured beam steering mirror positioned at the real exit pupil and configured to receive the collimated optical beam and to direct the collimated optical beam to the sensor, the aspheric figured beam steering mirror being further configured to move over a range of angular motion to steer a field of view of the sensor.

2. The all-reflective afocal optical imaging system of claim 1, wherein the sensor is a camera.

3. The all-reflective afocal optical imaging system of claim 1, wherein the afocal optical apparatus is an all-reflective derived afocal optical apparatus, derived from the first two mirrors of a multi-mirror focal optical system.

4. The all-reflective afocal optical imaging system of claim 3, wherein the multi-mirror focal optical system is one of a Cassegrain telescope and a focal three-mirror anastigmat.

5. The all-reflective afocal optical imaging system of claim 1, wherein the plurality of mirrors includes:
   a primary mirror positioned at the entrance pupil;
   a secondary mirror optically coupled to the primary mirror; and
   an eye-piece optically coupled to the secondary mirror and configured to receive the light rays from the secondary mirror and to provide the collimated optical beam to the aspheric figured beam steering mirror.

6. The all-reflective afocal optical imaging system of claim 5, wherein the eye-piece includes:
   a positive-powered tertiary mirror configured to substantially collimate the light rays received from the secondary mirror to provide substantially collimated light rays; and
   a negative-powered near-flat quaternary mirror having lesser power than the tertiary mirror and configured to receive the substantially collimated light rays from the tertiary mirror, to further collimate the substantially collimated light rays and to provide the collimated optical beam to the real exit pupil.

7. The all-reflective afocal optical imaging system of claim 6, wherein the primary mirror has an ellipsoidal configuration.

8. The all-reflective afocal optical imaging system of claim 7, wherein the secondary mirror has a hyperboloidal configuration and is positioned facing the primary mirror.

9. The all-reflective afocal optical imaging system of claim 5, wherein the eye-piece is positioned behind the primary mirror and the secondary mirror.

10. The all-reflective afocal optical imaging system of claim 5, wherein the primary mirror and the secondary mirror are the first two mirrors of a focal three-mirror anastigmat, and wherein the all-reflective afocal optical imaging system is a derived afocal system, derived from the first two mirrors of the focal three-mirror anastigmat.

11. The all-reflective afocal optical imaging system of claim 1, wherein the range of angular motion is at least ±4 degrees.

12. The all-reflective afocal optical imaging system of claim 11, wherein the angular range of motion is at least ±10 degrees.

13. An optical imaging method comprising:
   receiving light rays incident on an afocal optical apparatus including a plurality mirrors optically coupled together;
   reimaging and recollimating the light rays with the afocal optical apparatus to provide a collimated optical beam to a real exit pupil;
   reflecting the collimated optical beam with an aspheric figured beam steering mirror positioned at the real exit pupil to direct the collimated optical beam to an imaging sensor; and
   actuating the aspheric figured beam steering mirror over a range of angular motion to steer a field of view of the sensor.

14. The method of claim 13, wherein actuating the aspheric figured beam steering mirror includes actuating the aspheric figured beam steering mirror over an angular range of motion of at least ±4 degrees.

15. The method of claim 13, wherein actuating the aspheric figured beam steering mirror includes actuating the aspheric figured beam steering mirror over an angular range of motion of at least ±10 degrees.

16. The method of claim 13, wherein the afocal optical apparatus includes a primary mirror, a secondary mirror and an eye-piece, and wherein reimaging and recollimating the light rays includes:
   reflecting the light rays with the primary mirror towards the secondary mirror;
   reflecting the light rays received from the primary mirror with the secondary mirror towards the eye-piece; and
   recollimating the light rays received from the secondary mirror in the eye-piece to provide the collimated optical beam to the real exit pupil.

17. The method of claim 16, wherein the eye-piece includes a positive-powered tertiary mirror optically coupled to a negative-powered near-flat quaternary mirror having lesser power than the tertiary mirror, and wherein recollimating the light rays received from the secondary mirror in the eye-piece includes:
   substantially collimating the light rays received from the secondary mirror using the tertiary mirror to provide substantially collimated light rays;
   reflecting the substantially collimated light rays from the tertiary mirror to the quaternary mirror;
   further collimating the substantially collimated light rays using the quaternary mirror to provide the collimated optical beam; and
   reflecting the collimated optical beam from the quaternary mirror to the aspheric figured beam steering mirror at the real exit pupil.

* * * * *